INVENTORS
ROBERT DERYL MILLER
JOHN HAROLD EDMAN
DAVID HOFFER BUCHER

INVENTORS
ROBERT DERYL MILLER
JOHN HAROLD EDMAN
DAVID HOFFER BUCHER

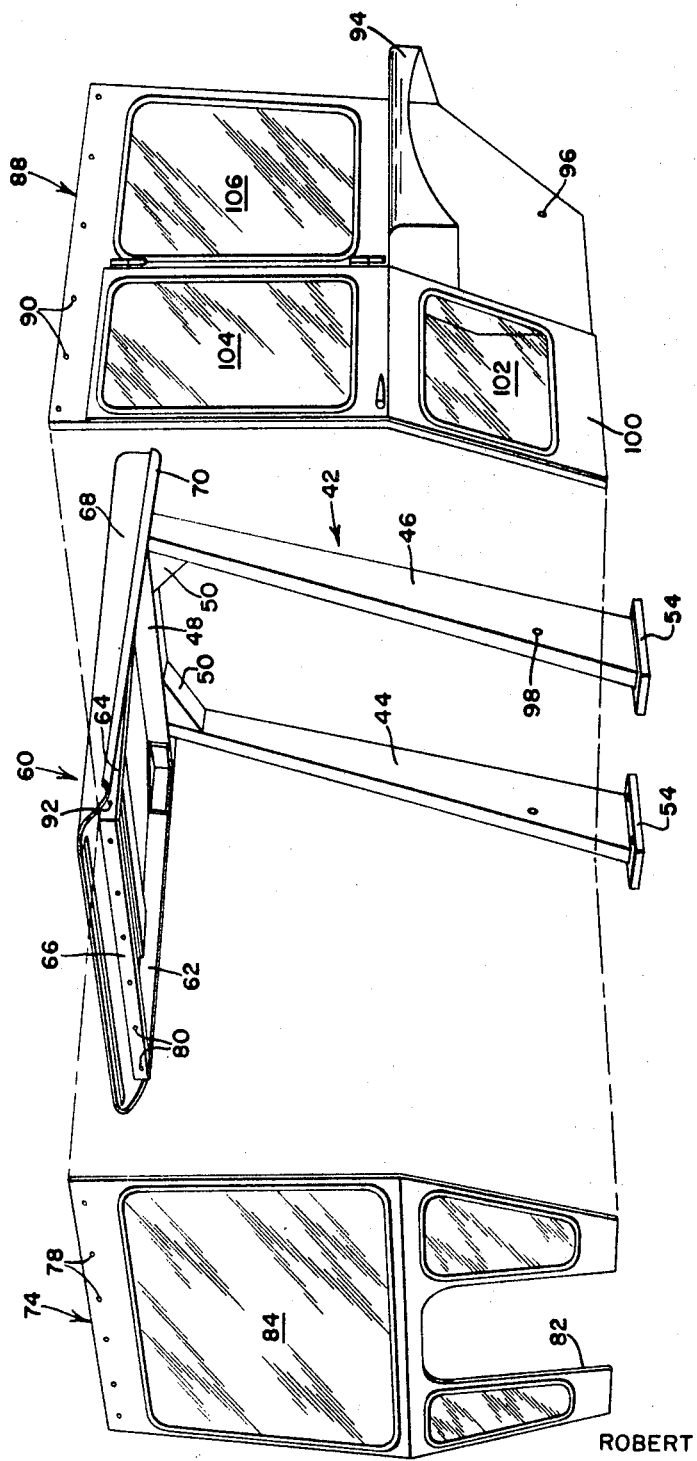

United States Patent Office 3,443,833
Patented May 13, 1969

3,443,833
SAFETY ENCLOSURE FOR TRACTORS
Robert Deryl Miller, John Harold Edman, and David Hoffer Bucher, Cedar Falls, Iowa, assignors to Deere & Company, Moline, Ill., a corporation of Delaware
Filed Mar. 10, 1967, Ser. No. 622,173
Int. Cl. B62d 25/06
U.S. Cl. 296—102                                2 Claims

ABSTRACT OF THE DISCLOSURE

A safety enclosure for the operator's station on a tractor, the enclosure including an inverted U-shaped roll bar structure encompassing the tractor seat, a cantilevered canopy attached to the roll bar structure and overlying the operator's station, and cab components removably attached to the canopy of the roll bar structure to conjunctively form a cab substantially enclosing the operator's station.

Background of the invention

The invention relates to a tractor roll bar structure having a canopy and cab attachable thereto to protect the operator from the elements.

Every year a large number of fatalities and injuries occur as the result of tractors tipping over during their operation. Many types of roll bar structures have been devised for attachment to tractors to provide some degree of roll-over protection for the operator. However, many of these structures have been relatively elaborate, or have interfered with the mounting of allied equipment on the tractor, or have impeded the visibility and freedom of the operator, and accordingly have not been widely accepted.

The comfort of the tractor operator has also been an increasingly important consideration in tractor design, and many types of tractor cabs and canopies have been designed to protect the operator from the elements. However, previous cabs and canopies have been incompatible with roll bar structures on the tractor, resulting in a sacrifice of either the comfort or the safety of the operator. In fact, most previously known tractor cabs and canopies have increased the hazards to the operator, since they interfered with the operator jumping clear of the tractor during a tractor upset.

Summary of the invention

According to the present invention, there is provided a simple, rugged roll bar structure, which is easily attachable to and removable from a tractor, and which does not interfere with the mounting of most equipment on the tractor or the visibility and convenience of the operator. There is also provided a cantilevered canopy structure, which can be optionally and rigidly secured to the roll bar structure in an overlying relationship with the operator's station to partially protect the operator from the elements, while avoiding interference of the visibility of the operator or with tractor-mounted equipment. The invention also features cab components which are attachable to the roll bar and the canopy structures to provide a tractor cab substantially enclosing the operator for maximum operator comfort, while the roll bar structure provides roll-over protection for the operator.

Another feature of the invention resides in the provision of such cab components which are easily attachable to and removable from the canopy and roll bar structure, so that the tractor may be optionally operated with or without the cab. Another advantage of the invention is the utilization of the roll bar structure and canopy for the frame of the tractor cab, so that no additional framing is necessary for the cab components, thereby reducing the cost of the cab. The particular cab construction also permits good operator visibility, since no front corner posts are necessary with the cantilevered canopy structure.

Still another object is to provide such roll bar, canopy, and cab components which can easily be adapted for attachment to many different types of tractors, and which can be provided as optional equipment for new tractors or for tractors already in the field.

Brief description of the drawings

FIG. 4 is a left front perspective of the roll bar structure and canopy separated from the tractor, and with the front and left side panels shown in an exploded relationship with the canopy and roll bar.

Figure 1:
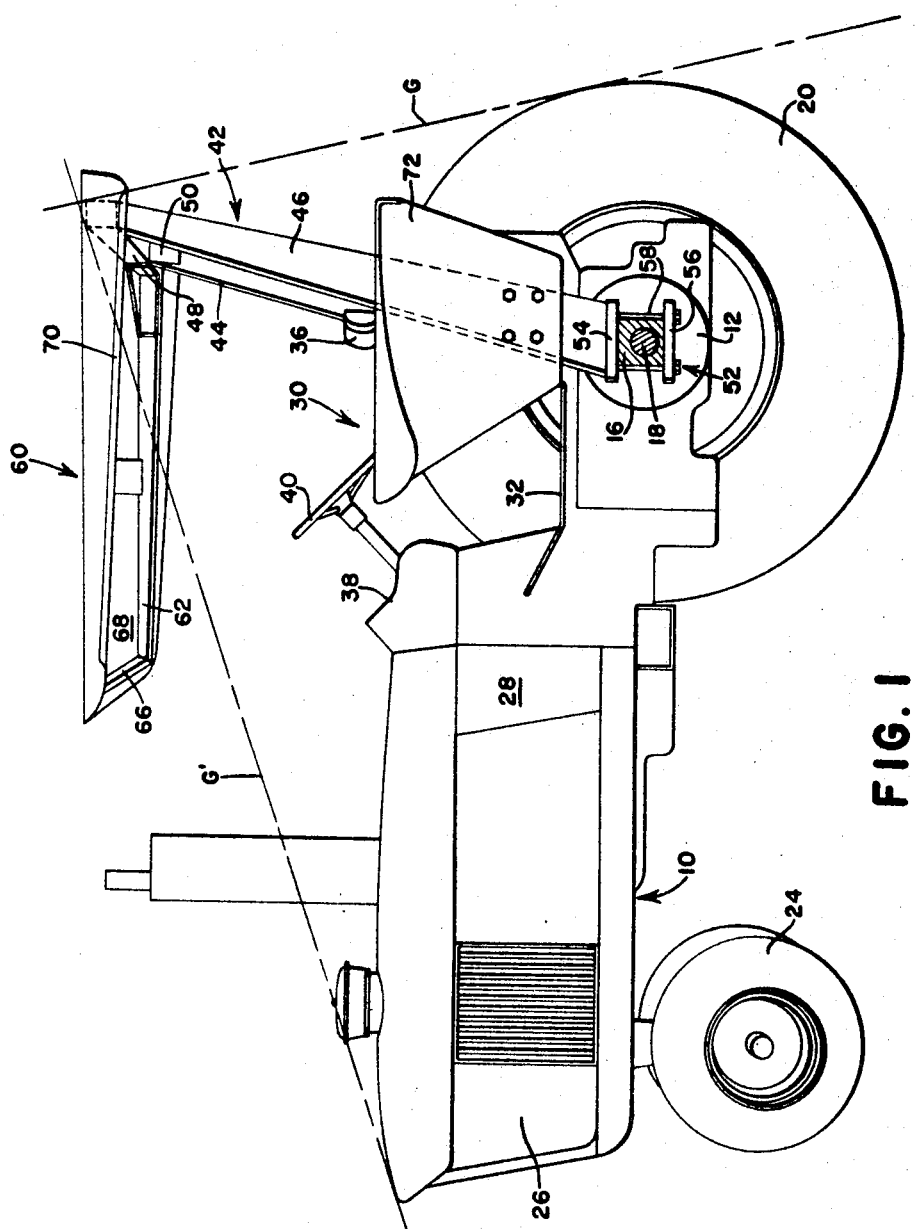
FIG. 1 is a left-side perspective view of the tractor with the roll bar and canopy mounted thereon and with the left wheel removed.

The invention is illustrated on a typical agricultural tractor having a fore-and-aft body or main frame 10 including a rearward transmission housing 12, from the opposite sides of which extend right and left, transversely extending, axle housings 14 and 16, respectively. The terms "right" and "left" are with reference to a person facing the forward end of the tractor, and such terms, as well as terms such as "forward," "rearward," "upper," "lower," etc. are terms of convenience, used to more clearly describe the invention, and are not to be construed as limitations. Each axle housing supports an axle 18 on which right- and left-hand traction wheels 20 and 22, respectively, are mounted. As best seen in FIG. 1, the axle housings 14 and 16 have a generally rectangular cross section, it being conventional to provide at least a portion of the axle housing with such a rectangular cross section.

The forward end of the tractor body is supported by steerable front wheels 24 and inscludes a fore-and-aft hood and grille structure 26, the rearward end of the hood forming an inverted generally U-shaped cowling 28. An operator's station, indicated in its entirety by the numeral 30, is disposed rearwardly of the cowing 28 and above the rearward transmission housing 12, the operator's station 30 including a floor 32, a seat support 34 mounted on the housing 12 rearwardly of the floor 32, a tractor seat 36 mounted on the seat support, an instrument panel 38 rearwardly of the cowling 28 and facing the tractor seat, and a steering wheel 40, projecting rearwardly from the cowling and instrument panel toward the tractor seat.

An inverted, generally U-shaped roll bar structure, indicated in its entirety by the numeral 42, is attachable to the axle housings 14 and 16 and includes generally parallel right and left upright leg members 44 and 46 respectively, connected at their upper ends by a transverse horizontal bight member 48, the opposite ends of the horizontal bight member 48 extending laterally beyond the upright legs and terminating above the right and left traction wheels 20 and 22. The roll bar members 44, 46, and 48 are of relatively strong, box-type beam construction, the connections between the upright members 44 and 46 and the horizontal member 48 being reinforced by corner blocks 50.

The lower ends of the upright leg members 44 and 46 are respectively attached to the right and left axle housings 14 and 16 by clamping devices 52, each clamping device including a flat horizontal plate 54 secured to the bottom of the upright leg member and engageable with the top of the axle housing, a bottom plate 56 engageable with the bottom surface of the axle housing, and a plurality of clamping bolts 58 operative to move the plates 56 and 58 toward one another, thereby clamping the upper plate and the leg member attached thereto to the axle housing. Since the top and the bottom of the axle housings are flat, they resist turning of the upright leg members about the axle in a fore-and-aft direction.

Figure 3:
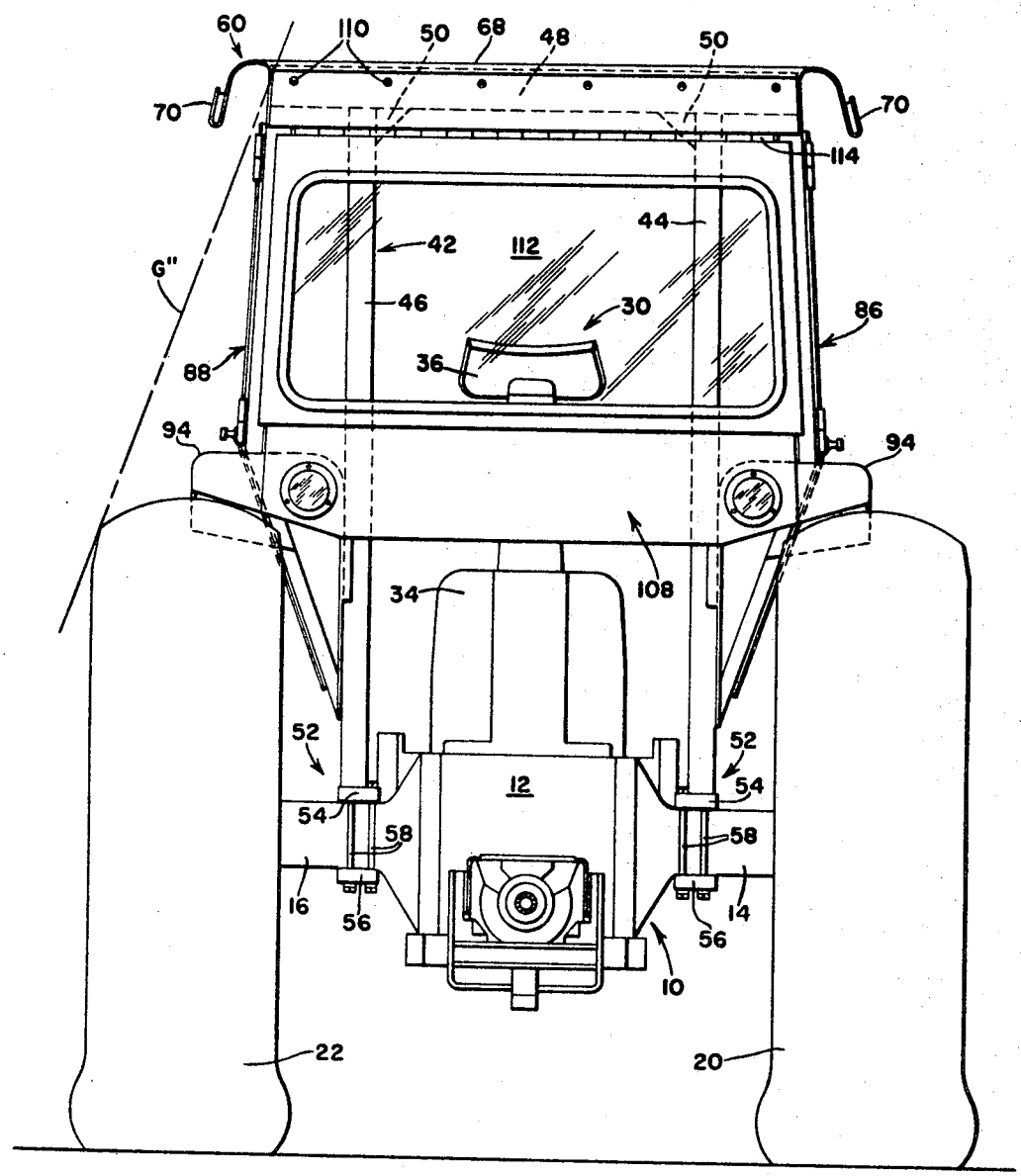
FIG. 3 is an enlarged rear elevation of the tractor with the cab mounted thereon.

The clamping device 52 and the roll bar members are sufficiently strong to not only support the tractor in an inverted position, but also withstand considerable impact without substantial deformation, such as would be imparted to the roll bar structure during a lateral or fore-and-aft tipping of the tractor. As best seen in FIG. 1, the back of the tractor seat 36 is in substantial vertical alignment with the axle housings, and the upright leg members 44 and 46 are slightly inclined rearwardly, so that the horizontal member 48 is above and rearwardly of the head of the operator while he is sitting in the seat 36. Since the head of the operator is forward of the horizontal member 48, the operator is protected should the tractor tip over rearwardly. The broken line in FIG. 1, identified by the letter G represents the ground line when the tractor has tipped over rearwardly, while the broken line identified by the letter G' identifies the ground line when the tractor is lying on its top. The front of the hood and grille structure 26 is preferably of reinforced construction, so that the front of the hood will support the weight of the tractor when it is lying on its top. As is apparent from FIG. 1, an operator strapped to the tractor seat 36 by a seat belt is suspended clear of the ground when the tractor is lying either on its back or on its top. The projection of the horizontal member 48 laterally beyond the upright members 44 and 46 provides an extra margin of safety for the operator during a lateral tipping of the tractor, as shown in FIG. 3, wherein the broken line identified by the letter G" indicates the ground when the tractor is lying on its side.

A relatively flat, horizontal canopy structure, indicated in its entirety by the numeral 60, is rigidly attached to the horizontal member 48 in a cantilevered fashion and overlies the operator's station, the canopy 60 including right and left fore-and-aft frame members 62 and 64 respectively having their rearward ends rigidly attached to the opposite ends of the horizontal member 48 and their forward ends attached to and connected by a transverse front frame member 66, the frame members 62, 64, and 66 in conjunction with the horizontal member 48 forming a rectangular horizontal frame. A relatively flat, horizontal roof 68, preferably made of fiber glass or similar material, is mounted on and substantially coextensive with the canopy frame and is formed with fore-and-aft extending gutters 70 along its opposite sides. As best seen in FIG. 1, a pair of fenders 72 can be attached to the right and left upright members 44 and 46 respectively between the tractor seat 36 and the right and left traction wheels 20 and 22.

Figure 2:
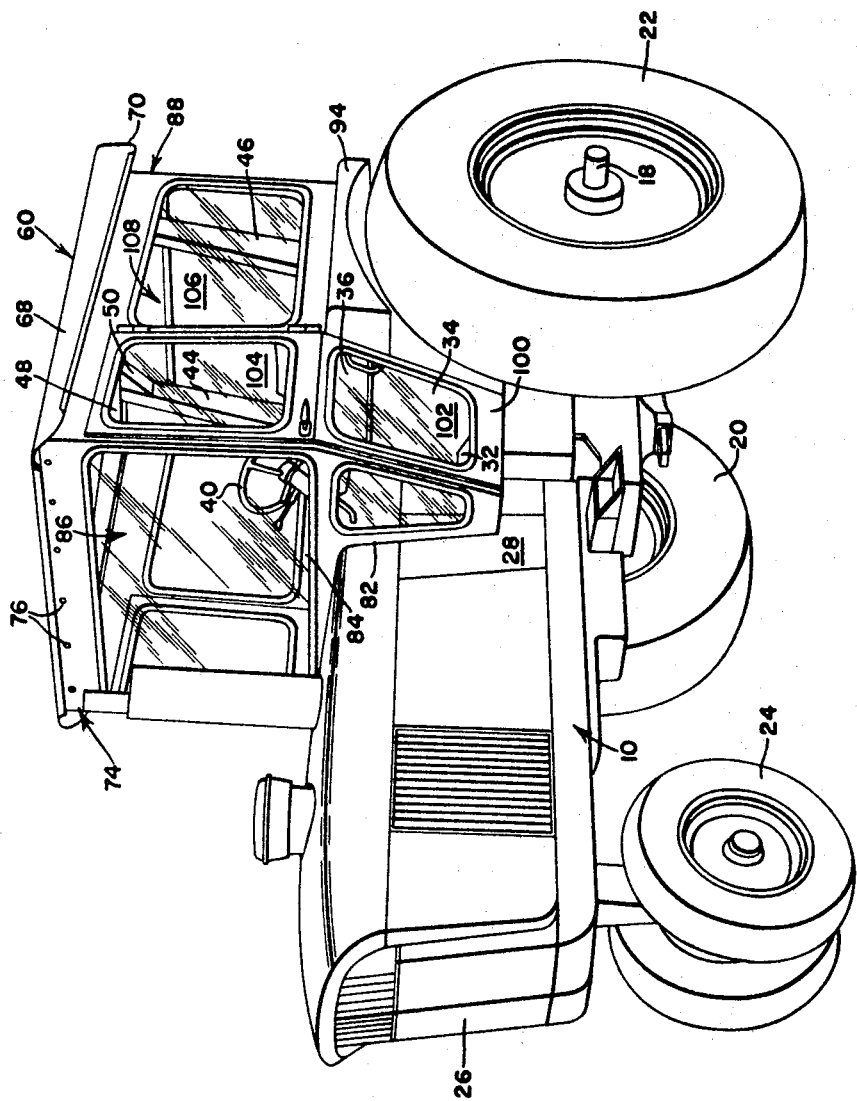
FIG. 2 is a left front perspective of the tractor shown in FIG. 1, but with the cab components assembled to the roll bar structure and canopy.

In addition to the safety provided by the roll bar structure 42, and the shielding from the elements provided by the canopy 60, the roll bar structure and the canopy can also be utilized as the frame and roof of a cab or enclosure for the operator's station. An embodiment of such a cab or enclosure is illustrated in FIGS. 2, 3, and 4 and includes a generally upright front panel or wall 74, the upper edge of which is substantially coextensive with and attachable to the front canopy frame member 66 by means of a plurality of fasteners 76 insertable through apertures 78 through the upper edge of the front panel and corresponding apertures 80 in the frame member 66. The lower portion of the front panel 74 is formed with an inverted U-shaped recess 82, which conforms to and fits around the tractor cowling 28 when the front panel 74 is attached to the frame member 66. Substantially the entire upper portion of the front panel 74 above the tractor cowling 28 is formed by a large windshield 84, preferably of tempered glass.

Upright, right and left side panels or walls 86 and 88 are respectively attachable to the right and left fore-and-aft frame members 62 and 64, the side panels 86 and 88 being of identical construction except that they are mirror images of one another, and therefore only one side panel will be described in detail, the left panel 88 only being illustrated in FIG. 4. The upper edges of the side panels are coextensive with and attachable to the fore-and-aft frame members 62 and 64 by means of fasteners inserted through spaced apertures 90 along the upper edge of the panel into corresponding apertures 92 in the frame member. When the side panels 86 and 88 are attached to the canopy, the fenders 72 must be removed, the side panels being formed with integral fenders 94 over the traction wheels. Approximately the lower one-half of the side panels are inclined downwardly and inwardly to provide clearance for the wheels, the lower edge of the side panels being attachable to the upright leg member of the roll bar structure by means of a fastener insertable through a hole 96 in the side panel and a corresponding hole 98 in the upright leg member. The forward edges of the side panels 86 and 88 respectively conform to the right and left side edges of the front panel 74, so that when the panels are attached to the canopy, the forward edges of the side panels are joined to the side edges of the front panel. Doors 100 are provided in the forward portion of the side panels for access to the cabin interior. Except for the portion of the side panels adjacent the wheels, almost the entire area of the side panels is formed by tempered glass windows 102, 104, and 106. Like the front panel 74, the lower edges of the side panels 86 and 88 extend to the floor 32 of the operator's station.

A generally upright, transverse rear panel or wall, indicated in its entirety by the numeral 108, has an upper edge coextensive with and attachable to the horizontal member 48 of the roll bar structure 42 by means of fasteners 110. When the rear panel 108 is attached to the roll bar structure, its opposite lateral edges conform with and are joined to the rearward edges of the side panels 86 and 88, the lower portion of the rear panel extending forwardly and cooperating with the seat supporting structure 34 and the floor 32 to enclose the rear end of the operator's station. Thus, when the panels 74, 86, 88, and 108 are attached to the canopy and roll bar structure, they completely enclose the operator's station in conjunction with the canopy 60. The upper portion of the rear panel 108 is chiefly formed by a tempered glass window 112, which is swingable upwardly and rearwardly about its upper edge on a transverse hinge 114.

In operation, the roll bar structure 42 only may be provided as an optional attachment to the tractor, the roll bar structure being easily attachable and removable from the tractor by means of the clamping device 52. As previously described, the roll bar structure will protect the operator in the event of a tractor upset, provided, of course, the operator is utilizing a seat belt and remains in the tractor seat. The configuration of the roll bar structure is such that it will not interfere with most equipment mounted on the tractor, although, if it should interfere with equipment such as a tractor-mounted corn picker, it is easily removable. The canopy 60 can be provided as an optional attachment for the roll bar structure and can be rigidly attached thereto. The canopy provides substantial protection for the operator from rain or the sun. If additional protection from the elements is desired, the front, side, and rear cab panels 74, 86, 88, and 108 respectively can be mounted on the roll bar structure and canopy to totally enclose the operator's station. As is apparent from the above, the attachment or removal of the panels is easily accomplished, so the tractor may be operated either with or without the cab according to the desires of the operator. As in conventional tractor cabs, heating or air conditioning units can be added to the tractor cab to provide additional operator comfort.

We claim:
1. In a tractor having a main tractor frame and including a transverse rear axle housing with transversely spaced rear wheels disposed at the opposite ends of the axle housing, an operator's station including a floor and a seat mounted on the frame above the rear axle housing, an inverted generally U-shaped cowling forwardly of the operator's station, and a roll bar and canopy structure attached only to the axle housing and including a pair of parallel leg members rigidly attached at their lower ends to the axle housing and extending upwardly therefrom on opposite sides of the seat between the rear wheels, a transverse horizontal member rigidly attached to the upper ends of the leg members and having its opposite ends disposed outwardly from the respective leg members, a canopy frame rigidly attached to and extending forwardly from the horizontal member and including a pair of fore-and-aft members respectively rigidly connected to and extending forwardly from the opposite ends of the horizontal member and a transverse front frame member rigidly attached to and extending between the forward ends of the fore-and-aft canopy frame members, and a generally horizontal roof rigidly attached to the canopy frame and overlying the operator's station, the improvement comprising: a generally upright rigid front wall having an upper edge substantially coextensive with and removably attached to the transverse canopy front frame member, an inverted generally U-shaped recess tightly encompassing the inverted generally U-shaped cowling forwardly of the operator's station, and opposite side edges, each side edge having an upper, generally upright portion and a lower downwardly and inwardly inclined portion; a pair of generally upright, fore-and-aft side walls respectively disposed on opposite sides of the seat outwardly of the opposite leg members and having upper edges substantially coextensive with and removably attached to the opposite fore-and-aft canopy frame members, the opposite side panels being substantially similar and having generally upright upper portions with forward edges joined to the respective upper portions of the side edges of the front wall and lower portions inclined downwardly and inwardly toward the leg members and having forward edges joined to the lower portions of the opposite side edges of the front wall; a pair of fenders attached to and extending outwardly from the respective side panels and adapted to overlie the respective tractor wheels, the fenders extending generally outwardly from the approximate upper ends of the lower portions of the side panels; and a generally upright transverse rear wall having an upper edge substantially coextensive with and removably attached to the rearward side of the transverse horizontal member, the rear wall having generally upright opposite side edges respectively joined to the rearward edges of the side walls, the front, rear, and side walls and the roof conjunctively forming an enclosure about the operator's station.

2. The invention defined in claim 1 wherein the lower, downwardly and inwardly inclined portions of the side panels are removably attached to the respective leg members.

References Cited
UNITED STATES PATENTS

| | | | |
|---|---|---|---|
| 2,423,748 | 7/1947 | Acheson | 296—28.21 |
| 2,921,799 | 1/1960 | Hatten | 296—102 |
| 3,191,712 | 6/1965 | Dodge | 296—28.21 |
| 3,191,987 | 6/1965 | Dodge | 296—102 |

FOREIGN PATENTS

| | | |
|---|---|---|
| 870,312 | 6/1961 | Great Britain. |
| 961,781 | 6/1962 | Great Britain. |

BENJAMIN HERSH, *Primary Examiner.*

R. R. SONG, *Assistant Examiner.*